United States Patent [19]

Ogawa et al.

[11] Patent Number: 5,162,402
[45] Date of Patent: Nov. 10, 1992

[54] SLUMP RETAINING AGENT

[75] Inventors: Hideo Ogawa, Ebina; Yoshio Tanaka, Komae; Tadashi Tsuchitani, Chigasaki, all of Japan

[73] Assignee: Sandoz Ltd., Basel, Switzerland

[21] Appl. No.: 787,191

[22] Filed: Nov. 4, 1991

[30] Foreign Application Priority Data

Nov. 6, 1990 [JP] Japan .................. 2-298960
Nov. 6, 1990 [JP] Japan .................. 2-298961

[51] Int. Cl.$^5$ ............................... C04B 24/00
[52] U.S. Cl. ...................... 524/5; 524/558; 526/318; 526/332
[58] Field of Search .............. 526/318, 332; 524/558, 524/5

[56] References Cited

U.S. PATENT DOCUMENTS

| | | | |
|---|---|---|---|
| 2,415,400 | 2/1947 | Armstrong et al. | 526/332 |
| 2,524,921 | 10/1950 | Minter | 526/318 |
| 3,025,282 | 3/1962 | Christman et al. | 526/332 |
| 3,278,469 | 10/1966 | Pascale | 524/558 |
| 3,342,787 | 9/1967 | Muskat | 524/558 |
| 3,436,378 | 4/1969 | Azorlosa et al. | 526/332 |
| 3,499,876 | 3/1970 | Field et al. | 526/332 |
| 3,544,344 | 12/1970 | Pratt et al. | 524/5 |
| 3,839,269 | 10/1974 | Comeggs | 524/5 |
| 4,808,641 | 2/1989 | Yagi et al. | 524/5 |
| 5,064,897 | 11/1991 | Tazi et al. | 526/332 |

*Primary Examiner*—Paul R. Michl
*Assistant Examiner*—Olga Asinovsky
*Attorney, Agent, or Firm*—Gerald D. Sharkin; Richard E. Vila; Walter F. Jewell

[57] ABSTRACT

A polymeric composition which reduces the loss of flowability of a cementitious composition comprises at least one polymer as a salt thereof having the form of a copolymer of (a) a maleic anhydride half-ester with a compound of the formula I $$RO(AO)_mH \qquad (I)$$

where R is a $C_{1-20}$alkyl group, A is a $C_{2-4}$alkylene group and m is an integer from 2–16; and (b) a monomer having the formula II $$CH_2=CHCH_2\text{-}(OA)_nOR \qquad (II)$$

where n is an integer from 1–90.

In a preferred embodiment, there is present a polycarboxylate salt which is at least one polymer or copolymer comprising at least one of the monomers acrylic acid, methacrylic acid, maleic anhydride, maleic acid and maleic acid monoester, polymer and polycarboxylate salt being blended in the proportion of 0.1–10 parts of weight of polymer per part of polycarboxylate salt.

Cementitious compositions such as concrete in which such polymeric compositions are included maintain their slump properties.

8 Claims, No Drawings

SLUMP RETAINING AGENT

This invention relates to the prevention of loss of flowability of cementitious products and more particularly to agents for preventing the gradual loss of flowability with time after mixing.

The term "cementitious products" used herein refers to products composed of a blending with water of cement, alone or blended with aggregate and any required types of cement admixtures. Examples include cement paste, cement grout, mortar and concrete.

It is very common to use a water-reducing agent (usually an air-entraining water reducer) in cementitious products, superplasticizers being particularly widely used. However, the use of superplasticizers introduces the problem of a considerable loss of flowability over time which is commonly expressed as "slump loss".

Most concrete currently used at construction projects is supplied as ready-mixed concrete. To prevent the abovementioned loss of slump over time after mixing, a superplastizer is added at the construction site immediately before placement; this is known as the job-site addition or post addition method. However, this method of addition requires special equipment and technicians, and naturally adds to the trouble and expense of the operation.

One approach to this problem of loss of flowability has been the use of powdered agents. Examples include cement dispersing agents which contain water-insoluble chemical substances such as copolymers of olefins and ethylenic unsaturated dicarboxylic anhydrides (Japanese Kokai 60-16851) or copolymers of styrene and maleic anhydride (Japanese Kokai 63-310756). However, the known powdered agents are not storage-stable over long periods of time and their ability to prevent the loss of flowability therefore decreases with time.

Other agents have been disclosed, but these all suffer from problems, for example Japanese Kokai's 60-161365 ((meth)acrylate ester copolymers—reduction of flowability with time), 1-113419 (aromatic amino sulphonate and formaldehyde condensate salts—very expensive), 58-74552 (polycarboxylate salts—inferior performance) and 2-162108 (polyoxyalkylene unsaturated ether—maleic ester copolymers—high dose required, very long setting time, large air entrainment).

There have now been discovered compounds which substantially and often completely overcome these problems. There is therefore provided, according to the present invention, a polymeric composition adapted to reduce the loss of flowability of a cementitious composition, the polymeric composition comprising at least one polymer or a salt thereof having the form of a copolymer of (a) a maleic anhydride half-ester with a compound of the formula I

RO(AO)$_m$H    (I)

where R is a C$_{1-20}$ alkyl group, A is a C$_{2-4}$alkylene group and m is an integer from 2-16; and
(b) a monomer having the formula II

CH$_2$=CHCH$_2$—(OA)$_n$OR    (II)

where n is an integer from 1-90 and R is a C$_{1-20}$alkyl group.

The preferred polymers are polymers with an average molecular weight in the range 5,000-500,000, in terms of polyethylene glycol conversion. This is a standard measurement wherein molecular weight is measured by GPC using a polyethylene glycol as standard. Particular examples include hexaethylene glycol allyl methyl ether-maleic acid butyltetraethylene glycol tetrapropylene glycol monoester; hexaethylene glycol allyl methylether-maleic acid methyltetraethylene glycol monoester, dodecaethylene glycol allyl methylether-maleic acid methyloctaethylene glycol monoester; hexaethylene glycol allylmethylether-maleic acid methyl octaethylene glycol monoester; polyethylene glycol (n=22) allyl methylether-maleic acid methyl dodecaethylene glycol monoester; polyethylene glycol (n=45) allyl methylether-maleic acid methyl dodecaethylene glycol monoester; polyethylene glycol (n=18) allyl methylether-maleic acid methyl dodecaethylene glycol monoester and their salts.

Preferred examples of their salts include alkali metal salt, alkaline earth metal salt, ammonium salt, lower amine salt, or lower amino alcohol salt. The polymer is not limited to those described above and it may be prepared by any suitable method known to the polymerization art.

In a especially preferred embodiment, it has been found that the combination of the abovementioned polymers with certain polycarboxylate salts gives a flowability loss-prevention composition which is particularly good. There is therefore provided a composition adapted to reduce the loss of flowability in a cementitious composition, the composition comprising a polymer as hereinabove described and a polycarboxylate salt which is at least one polymer or copolymer comprising at least one of the monomers acrylic acid, methacrylic acid, maleic anhydride, maleic acid and maleic acid monoester, polymer and polycarboxylate salt being blended in the proportion of 0.1-10 parts of weight of polymer per part of polycarboxylate salt.

Preferably the polycarboxylate salt consists only of monomer units selected from one or more of acrylic acid, methacrylic acid, maleic acid and maleic anhydride monoester, but other monomer units such as alkylacrylates, methacrylates and styrene may be used. Specific examples of suitable polycarboxylate salts include the copolymer salts of methacrylic acid-hydroxypropyl methacrylate, acrylic acid-hydroxyethyl acrylate, methacrylic acid-methyldecaethyleneglycol methacrylate, styrene-methyldecaethyleneglycol maleate, copolymer salt of styrene-butyl maleate, methyl hexaethyleneglycol allyl ether-maleic acid, vinyl acetate-maleic acid, and methyl vinylether-maleic acid.

The preferred examples of salts are the same as those for the polymer.

The abovementioned polymers exhibit a very slow rate of adsorption, compared to the rated of adsorption of normal cement dispersing agents to cement particles. There is almost no adsorption on to cement particles immediately after addition, most remaining in the liquid phase, and there is very little dispersing effect on cement particles. Over time, usually 30 or 60 minutes, the polymer is slowly adsorbed to the cement particles, helping to maintain them in a dispersed state. The flowability of cementitious particles can thus be maintained over time, and slump in concrete is retained.

When the polycarboxylate salt is used in conjunction with the polymer, the polycarboxylate salt adsorbs on to the cement particles prior to the adsorption of the polymer. Over about 30-60 minutes, the dispersing effect of the polycarboxylate salt reduces and the polymer is slowly adsorbed, thus enhancing the cement dispersion and maintaining flow.

In recent years, the time required to haul fresh concrete has been increasing, resulting in problems with the loss in slump over time. Addition of a polymeric composition as hereinabove described prevents this loss of flowability.

The dosage required is very much dependent on the rate of slump loss. This will vary widely, depending on the nature of the particular batch, temperature, etc. and therefore no figure can be quoted with certainty. However, the skilled person can readily determine the dosage required to maintain a desired degree of slump during placement. For example, at a concrete temperature of 20° C., the general dosage of polymeric composition needed to maintain mixing time slump is of the order of 0.01-20% by weight of cement, when no polycarboxylate salt is used. When the polymeric composition comprises a polycarboxylate salt, the dosage required is from 0.05-5.0% by weight of cement.

When a polymeric composition according to the invention is used in concrete, it is desirable to add it during mixing at the concrete manufacturing plant, although it can also be added after mixing.

The abovementioned polymeric compositions, when added to fresh concrete to which a water reducer or, more particularly, a superplasticizer has been added, enable high flowability to be maintained, with no loss in slump over time, greater work efficiency at the construction site, and greater concrete quality as a result of the prevention of the formation of defects during hardening.

The concrete in which this flowability loss-preventing composition is used can also include any of several well-known water reducers, such as naphthalene sulfonate salt-formaldehyde condensates, melamine sulfonate salt-formaldehyde condensates, ligning sulfonate salts, polycarboxylate (salts), oxycarboxylate salts, glucosaccharides, and copolymers of straight chain or cyclic olefins having 4-6 carbon atoms, and ethylenically-unsaturated dicarboxylic anhydrides.

The invention is further illustrated by reference to the following examples in which all parts are expressed by weight.

EXAMPLE 1

A variety of polymers are used in this example. These are designated FLPA-1 to FLPA-7 and their characteristics are set out hereinunder. The molecular weight (Mw) stated results from gel chromatographic analysis.

FPLA-1: Hexaethylene glycol allyl methylether - maleic acid butyltetraethylene glycol tetrapropylene
 glycol monoester.
 Mw = 15,000
FLPA-2: Hexaethylene glycol allyl methylether - maleic acid methyltetraethylene glycol monoester.
 Mw = 8,000
FLPA-3: Dodecaethylene glycol allyl methylether - maleic acid methyloctaethylene glycol monoester.
 Mw = 15,000
FLPA-4: Hexaethylene glycol allyl methylether - maleic acid methyloctaethylene glycol monoester.
 Mw = 12,000
FLPA-5: Polyethylene glycol (n = 22) allyl methylether - maleic acid methyldodecaethylene glycol monoester.
 Mw = 15,000
FLPA-6: Polyethylene glycol (n = 45) allyl methylether - maleic acid methyldodecaethylene glycol monoester.
 Mw = 20,000
FLPA-7: Polyethylene glycol (n = 18) allyl methylether - maleic acid methyldodecaethylene glycol monoester.
 Mw = 40,000

These polymers are incorporated into concrete mixes prepared according to two mix-design conditions I and II

Mix-Design Conditions

| Mix-design | Water/cement (%) | Sand/aggregate (%) | Unit contents (kg/m$^3$) | |
|---|---|---|---|---|
| | | | Cement | Water |
| I | 63.4 | 49 | 320 | 203 |
| II | 51.9 | 47 | 320 | 166 |

Materials:
Cement: Ordinary portland cement (3 brands in equal quantities, Sp. Gr. 3.16)
Fine Aggregate: Mixture of Oi river sand and Kisarazu land sand (Sp. Gr. 2.62, FM 2.71)
Course aggregate: Tokyo Ome hard crushed sandstone (Sp. Gr. 2.64, MS 20 mm)

High range water reducers (superplasticizers) are
BNSF: Naphthalene sulfonate salt formaldehyde condensate
MSF: Melamine sulfonate salt formaldehyde condensate Also prepared are three comparison examples, one with no additive (made according to I) and two with superplasticizers (made according to II). The air content immediately after mixing with a forced mixing type mixer is adjusted to 4.5±0.5% by volume using an air content controlling agent, an air entraining agent, and/or a commercially available defoaming agent. Concrete testing was performed according to JIS A 6204

The results are shown in Tables 1 and 2.

In Table 1, the slump values in comparison examples 2 and 3 decrease over time, whereas in invention examples 1-12 the slump value, although low at 8-15 cm immediately after mixing, increases to 19-24 cm 30 minutes later and shows almost no loss even after 90 min., fully maintaining the slump value. In this way, the compounds of this invention have shown themselves capable of maintaining the slump of mixed concrete.

TABLE 1

Concrete Test Results (Part 1)

| No. | | Additive | | Concrete slump (cm)[Air (%)]$^2$ | | | |
|---|---|---|---|---|---|---|---|
| | | Type | Dosage$^1$ | 0 min | 30 min | 60 min | 90 min |
| Comparison examples | 1 | Plain | — | 19.0 [2.0] | 17.0 [2.0] | 15.5 [1.8] | 12.5 [1.7] |
| | 2 | BNSF | 0.50 | 18.0 [4.4] | 10.5 [4.1] | 6.5 [3.8] | 4.0 [3.3] |
| | 3 | MSF | 0.60 | 18.5 [4.2] | 9.5 [4.0] | 6.5 [3.9] | 4.0 [3.1] |
| Examples according to the invention | 1 | FLPA-1 | 0.30 | 10.0 [4.0] | 20.0 [4.2] | 20.0 [4.3] | 19.5 [4.9] |
| | 2 | FLPA-1 | 0.40 | 13.0 [4.6] | 20.5 [4.2] | 21.0 [4.6] | 20.0 [4.8] |
| | 3 | FLPA-2 | 0.20 | 14.0 [4.5] | 24.0 [4.5] | 23.0 [4.2] | 22.5 [4.0] |
| | 4 | FLPA-2 | 0.30 | 15.5 [4.7] | 24.0 [4.0] | 24.0 [3.9] | 23.0 [4.0] |

TABLE 1-continued

| | Additive | | Concrete Test Results (Part 1) Concrete slump (cm)[Air (%)][2] | | | |
|---|---|---|---|---|---|---|
| No. | Type | Dosage[1] | 0 min | 30 min | 60 min | 90 min |
| 5 | FLPA-3 | 0.30 | 10.0 [4.4] | 20.0 [4.0] | 19.5 [4.3] | 19.0 [5.0] |
| 6 | FLPA-3 | 0.40 | 12.0 [4.3] | 22.5 [4.0] | 21.0 [4.8] | 21.0 [4.3] |
| 7 | FLPA-4 | 0.30 | 8.0 [4.5] | 17.0 [4.3] | 20.0 [4.3] | 19.0 [4.5] |
| 8 | FLPA-4 | 0.40 | 9.0 [4.8] | 19.0 [4.0] | 22.0 [4.3] | 21.5 [4.9] |
| 9 | FLPA-5 | 0.30 | 11.0 [4.8] | 19.5 [4.3] | 19.0 [4.0] | 18.0 [4.0] |
| 10 | FLPA-5 | 0.40 | 13.0 [4.4] | 22.0 [4.0] | 20.0 [4.2] | 20.5 [4.3] |
| 11 | FLPA-6 | 0.30 | 12.0 [4.9] | 19.0 [4.7] | 20.0 [4.6] | 18.0 [4.7] |
| 12 | FLPA-6 | 0.40 | 11.0 [4.5] | 21.0 [4.3] | 20.0 [4.0] | 20.0 [4.6] |
| 13 | FLPA-7 | 0.40 | 5.0 [4.0] | 8.0 [4.0] | 10.0 [4.0] | 12.0 [4.3] |
| 14 | FLPA-7 | 0.50 | 8.0 [4.0] | 8.0 [4.0] | 13.0 [4.2] | 12.0 [4.2] |

[1] wt. % on cement
[2] Change in air content was determined using a tilting type mixer at 2 r.p.m.

TABLE 2

| | | Concrete Test Resuls (Part 2) | | | | | |
|---|---|---|---|---|---|---|---|
| | | Sample | | Slump | Air | Setting time (hr-min) | | 28-d Comp. strength |
| No. | | Type | Dosage | (cm) | (%) | Initial | Final | (kgf/cm²) |
| Comparison examples | 1 | Plain | — | 19.0 | 2.0 | 5-40 | 7-50 | 329 |
| | 2 | BNSF | 0.50 | 18.0 | 4.4 | 5-30 | 7-30 | 407 |
| | 3 | MSF | 0.60 | 18.5 | 4.2 | 5-30 | 7-40 | 410 |
| Examples according | 1 | FLPA-1 | 0.30 | 10.0 | 4.0 | 10-00 | 12-30 | 489 |
| | 2 | FLPA-1 | 0.40 | 13.0 | 4.6 | 13-30 | 15-30 | 490 |
| | 3 | FLPA-2 | 0.20 | 14.0 | 4.5 | 15-30 | 18-50 | 482 |
| | 4 | FLPA-2 | 0.30 | 15.5 | 4.7 | 17-30 | 20-30 | 463 |
| | 5 | FLPA-3 | 0.03 | 10.0 | 4.4 | 9-00 | 11-30 | 475 |
| | 6 | FLPA-3 | 0.40 | 12.0 | 4.3 | 12-00 | 14-00 | 495 |
| | 7 | FLPA-4 | 0.30 | 8.0 | 4.5 | 10-00 | 13-00 | 494 |
| | 8 | FLPA-4 | 0.40 | 9.0 | 4.8 | 12-30 | 15-00 | 475 |
| | 9 | FLPA-5 | 0.30 | 11.0 | 4.8 | 8-30 | 10-00 | 485 |
| | 10 | FLPA-5 | 0.40 | 13.0 | 4.4 | 10-00 | 13-00 | 475 |
| | 11 | FLPA-6 | 0.30 | 12.0 | 4.9 | 7-30 | 9-30 | 494 |
| | 12 | FLPA-6 | 0.40 | 11.0 | 4.5 | 9-00 | 11-00 | 515 |
| | 13 | FLPA-7 | 0.40 | 5.0 | 4.0 | 5-30 | 7-00 | 505 |
| | 14 | FLPA-7 | 0.50 | 8.0 | 4.0 | 6-00 | 8-00 | 488 |

EXAMPLE 2

This example illustrates the use of polycarboxylate salts in conjunction with the polymers of Example 1. The salts are referred to as PCAS-1 to PCAS-8, and their details are as follows:

Weight average molecular weight in terms of polyethyleneglycol conversion (Mw) given as results of gel chromatographic analysis.

PCAS-1: Copolymer salt of methacrylic acid-hydroxypropyl methacrylate, Mw=8,000

PCAS-2: Copolymer salt of acrylic acid-hydroxypropyl acrylate, Mw=6,000

PCAS-3: Copolymer salt of methacrylic acid-methyl decaethyleneglycol methacrylate, Mw=20,000

PCAS-4: Copolymer salt of styrene-methyl decaethyleneglycol maleate, Mw=15,000

PCAS-5: Copolymer salt of styrene-butyl maleate, Mw=10,000

PCAS-6: Copolymer salt of methyl hexaethyleneglycol allyl ether-maleic acid, Mw=10,000

PCAS-7: Copolymer salt of vinyl acetate-maleic acid, Mw=7,000

PCAS-8: Copolymer salt of methyl vinyl ether-maleic acid, Mw=7,000

PREPARATION OF COMPOSITIONS

To 100 parts of a 40% aqueous solution of polycarboxylate salt PCAS-1 are added, under mechanical stirring 50 parts by weight of a 40% aqueous solution of Polymer FLPA-1 at 20° C. The mixture is then stirred for 5 hours to obtain a homogeneous solution. The pH is adjusted with an aqueous solution of caustic soda to 7.0, whereupon it is left to stand for 24 hours, yielding a polymeric composition of this invention as a 40% aqueous solution. This composition was designated FLCD-1.

This procedure is repeated for the combination shown below in Table 3

TABLE 3

| Composition | Polycarboxylate salt and polymer | Mixing ratio by weight | Viscosity of 40% soln. (cps)[1] |
|---|---|---|---|
| FLCD-1 | PCAS-1:FLPA-1 | 1:1 | 380 |
| -2 | PCAS-1:FLPA-2 | 1:1 | 360 |
| -3 | PCAS-3:FLPA-3 | 1:0.3 | 470 |
| -4 | PCAS-3:FLPA-2 | 1:0.5 | 510 |
| -5 | PCAS-3:FLPA-3 | 1:1.5 | 470 |
| -6 | PCAS-4:FLPA-3 | 1:0.8 | 320 |
| -7 | PCAS-4:FLPA-4 | 1:1 | 420 |
| -8 | PCAS-4:FLPA-3 | 1:0.5 | 390 |
| -9 | PCAS-4:FLPA-5 | 1:0.5 | 530 |
| -10 | PCAS-4:FLPA-6 | 1:1 | 420 |
| -11 | PCAS-4:FLPA-7 | 1:2 | 630 |
| -12 | PCAS-5:FLPA-1 | 1:1 | 400 |
| -13 | PCAS-6:FLPA-3 | 1:1 | 300 |
| -14 | PCAS-7:FLPA-1 | 1:0.4 | 350 |
| -15 | PCAS-8:FLPA-4 | 1:0.5 | 360 |

[1] The viscosity is measured 24 hours after the samples were mixed, with a B type viscosimeter run at 60 r.p.m. at 20° C.

TESTING OF CONCRETE

Compositions FLCD-1 to FLCD-15 as prepared above are mixed with the cement, sand, gravel and water in the mix-design conditions (II) shown in Example 1, made into concrete, and the slump retention effect is evaluated. Comparison example 1 is performed using the mix-design conditions of (I), and comparison of examples 2-15 are performed using the mix-design conditions. The materials used are the same as in period slump retention, with almost no loss even after 90 min. fully maintaining the slump value.

In Table 5, the properties of concrete using the flowability loss cement dispersing agent of this invention have shown themselves equal to those of normal concrete.

TABLE 4

Concrete Test Results (Part 1)[1]

| No. | | Composition Type | Dosage[2] | Concrete slump (cm)[Air (%)][3] | | | |
|---|---|---|---|---|---|---|---|
| | | | | 0 min | 30 min | 60 min | 90 min |
| Comparison examples | 1 | Plain | — | 19.0 [2.0] | 17.0 [2.0] | 15.5 [1.8] | 12.5 [1.7] |
| | 2 | BNSF | 0.50 | 18.0 [4.4] | 10.5 [4.1] | 6.5 [3.8] | 4.0 [3.3] |
| | 3 | MSF | 0.60 | 18.5 [4.2] | 9.5 [4.0] | 6.5 [3.9] | 4.0 [3.1] |
| | 4 | PCAS-1 | 0.25 | 18.5 [4.0] | 15.0 [4.0] | 12.5 [4.0] | 9.0 [4.5] |
| | 5 | FLPA-1 | 0.30 | 10.0 [4.0] | 20.0 [4.2] | 20.0 [4.3] | 19.5 [4.9] |
| Examples according to the invention | 1 | FLCD-1 | 0.35 | 18.0 [4.4] | 19.0 [4.0] | 19.0 [4.2] | 18.5 [4.7] |
| | 2 | FLCD-2 | 0.20 | 19.0 [4.6] | 19.5 [4.5] | 18.5 [4.0] | 18.0 [4.9] |
| | 3 | FLCD-3 | 0.25 | 18.0 [4.7] | 21.0 [4.7] | 20.0 [4.5] | 18.5 [4.7] |
| | 4 | FLCD-4 | 0.20 | 18.5 [4.7] | 20.0 [4.3] | 20.0 [4.2] | 19.0 [4.8] |
| | 5 | FLCD-5 | 0.30 | 19.0 [5.0] | 20.5 [4.2] | 18.5 [4.4] | 18.5 [5.0] |
| | 6 | FLCD-6 | 0.30 | 19.0 [4.9] | 20.5 [4.3] | 20.0 [4.7] | 18.0 [4.8] |
| | 7 | FLCD-7 | 0.30 | 18.0 [4.5] | 20.0 [4.0] | 19.0 [4.0] | 18.0 [4.4] |
| | 8 | FLCD-8 | 0.30 | 17.0 [4.0] | 19.5 [4.0] | 19.0 [4.0] | 18.5 [4.3] |
| | 9 | FLCD-9 | 0.30 | 18.0 [4.5] | 19.5 [4.2] | 19.0 [4.0] | 18.5 [4.2] |
| | 10 | FLCD-10 | 0.30 | 18.0 [4.4] | 20.0 [4.2] | 20.0 [4.0] | 18.5 [4.3] |
| | 11 | FLCD-11 | 0.55 | 18.0 [4.6] | 19.0 [4.7] | 21.0 [4.9] | 20.0 [4.8] |
| | 12 | FLCD-12 | 0.30 | 17.0 [4.0] | 20.0 [4.0] | 19.0 [4.2] | 17.0 [4.6] |
| | 13 | FLCD-13 | 0.30 | 17.0 [4.5] | 21.0 [4.2] | 20.0 [4.1] | 20.0 [4.0] |
| | 14 | FLCD-14 | 0.30 | 19.0 [4.3] | 19.0 [4.0] | 18.0 [4.2] | 17.0 [4.5] |
| | 15 | FLCD-15 | 0.30 | 19.0 [4.4] | 20.0 [4.3] | 18.5 [4.8] | 16.5 [5.0] |

Notes:
[1]Mixing is performed using a forced mixing type mixer.
[2]Given in weight percentages on cement
[3]Change in air content was determined using a tilting type mixer at 2 r.p.m.

TABLE 5

Concrete Test Resuls (Part 2)

| No. | | Sample Type | Dosage | Slump (cm) | Air (%) | Setting time (hr-min) | | 28-day Comp. strength (kgf/cm$^2$) |
|---|---|---|---|---|---|---|---|---|
| | | | | | | Initial | Final | |
| Comparison examples | 1 | Plain | — | 19.0 | 2.0 | 5-40 | 7-50 | 329 |
| | 2 | BNSF | 0.50 | 18.0 | 4.4 | 5-30 | 7-30 | 407 |
| | 3 | MSF | 0.60 | 18.5 | 4.2 | 5-30 | 7-40 | 410 |
| | 4 | PCAS-1 | 0.25 | 18.0 | 4.0 | 6-10 | 8-30 | 467 |
| | 5 | FLPA-1 | 0.30 | 10.0 | 4.0 | 10-00 | 12-30 | 489 |
| Examples according | 1 | FLCD-1 | 0.35 | 18.0 | 4.4 | 6-30 | 8-30 | 460 |
| | 2 | FLCD-2 | 0.20 | 19.0 | 4.6 | 6-50 | 9-50 | 470 |
| | 3 | FLCD-3 | 0.25 | 18.0 | 4.2 | 6-30 | 8-40 | 463 |
| | 4 | FLCD-4 | 0.20 | 18.5 | 4.7 | 6-55 | 9-30 | 486 |
| | 5 | FLCD-5 | 0.30 | 19.0 | 5.0 | 6-10 | 8-30 | 450 |
| | 6 | FLCD-6 | 0.30 | 19.0 | 4.9 | 7-00 | 9-10 | 460 |
| | 7 | FLCD-7 | 0.30 | 18.0 | 4.6 | 7-00 | 9-00 | 472 |
| | 8 | FLCD-8 | 0.30 | 17.0 | 4.0 | 6-30 | 8-40 | 453 |
| | 9 | FLCD-9 | 0.30 | 18.0 | 4.5 | 6-30 | 8-15 | 465 |
| | 10 | FLCD-10 | 0.30 | 18.0 | 4.4 | 7-00 | 9-00 | 475 |
| | 11 | FLCD-11 | 0.55 | 18.0 | 4.6 | 6-50 | 9-50 | 494 |
| | 12 | FLCD-12 | 0.30 | 17.0 | 4.0 | 6-00 | 8-10 | 455 |
| | 13 | FLCD-13 | 0.30 | 17.5 | 4.5 | 6-00 | 8-00 | 460 |
| | 14 | FLCD-14 | 0.30 | 19.0 | 4.3 | 6-30 | 8-20 | 445 |
| | 15 | FLCD-15 | 0.30 | 18.0 | 4.6 | 6-40 | 9-00 | 470 |

EXAMPLE 1

Concrete testing is performed according to JIS A 6204. The measure results are shown in Tables 4 and 5. The air content immediately after mixing is adjusted to 4.5±0.5% by volume using an air content controlling agent, an air entraining agent, and/or a defoaming agent available on the market, as required.

In Table 4, the slump values in comparison examples show a 2-4% increase over time, and the slump value of comparison example 5 shows a low slump value immediately after mixing, with a large increase after 30 min., exhibiting maintenance of slump over a long period. The slump values in invention examples 1-15 show long

We claim:
1. A polymeric composition adapted to reduce the loss of flowability of a cementitious composition, the polymeric composition comprising at least one polymer or a salt thereof having the form of a copolymer of
(a) a maleic anhydride half-ester with a compound of the formula I

$$RO(AO)_mH \qquad (I)$$

where R is a $C_{1-20}$alkyl group, A is a $C_{2-4}$alkylene group and m is an integer from 2-16; and
(b) a monomer having the formula II $$CH_2=CHCH_2-(OA)_nOR \qquad (II)$$

where n is an integer from 1-90 and R is a $C_{1-20}$alkyl group.

2. A polymeric composition according to claim 1, wherein the composition additionally comprises a polycarboxylate salt which is a polymer or copolymer comprising at least one of the monomers acrylic acid, methacrylic acid, maleic anhydride, maleic acid and maleic acid monoester, polymer and polycarboxylate salt being blended in the proportion of 0.1-10 parts of weight of polymer per part of polycarboxylate salt.

3. A polymeric composition according to claim 1 or claim 2, wherein the polymer has an average molecular weight of from 5,000-500,000 in terms of polyethylene glycol conversion.

4. A polymeric composition according to any one of claims 1 or 2 wherein the polymer and the polycarboxylate salt are salts selected from the alkali metal, alkaline earth metal, ammonium, lower amine and lower amino alcohol salts.

5. A polymeric composition according to claim 2, wherein the polycarboxylate salt consists of monomer units selected from one or more of acrylic acid, methacrylic acid, maleic acid and maleic anhydride monoester.

6. A polymeric composition according to any one of claims 1 or 2 wherein the polymer is selected from hexaethylene glycol allyl methyl ether-maleic acid butyltetraethylene glycol tetrapropylene glycol monoester; hexaethylene glycol allyl methylether-maleic acid methyltetraethylene glycol monoester, dodecaethylene glycol allyl methylether-maleic acid methyloctaethylene glycol monoester; hexaethylene glycol allylmethylether-maleic acid methyl octaethylene glycol monoester; polyethylene glycol (n=22) allyl methylether-maleic acid methyl dodecaethylene glycol monoester; polyethylene glycol (n=45) allyl methylether-maleic acid methyl dodecaethylene glycol monoester; polyethylene glycol (n=18) allyl methylether-maleic acid methyl dodecaethylene glycol monoester and their salts.

7. A polymeric composition according to claim 2, wherein the polycarboxylate salt is selected from the copolymer salts of methacrylic acid-hydroxypropyl methacrylate, acrylic acid-hydroxyethyl acrylate, methacrylic acid-methyldecaethyleneglycol methacrylate, styrene-methyldecaethyleneglycol maleate, styrene-butyl maleate, methyl hexaethyleneglycol allyl ether-maleic acid, vinyl acetate-maleic acid, and methyl vinylether-maleic acid.

8. A cementitious composition comprising a polymeric composition according to any one of claim 1 or 2.

* * * * *